US010574767B2

(12) United States Patent
Mengistu

(10) Patent No.: US 10,574,767 B2
(45) Date of Patent: *Feb. 25, 2020

(54) SYSTEM AND METHOD FOR PROVIDING REAL-TIME MEDIA CONSUMPTION DATA

(71) Applicant: SPOTIFY AB, Stockholm (SE)

(72) Inventor: Abeyu Mengistu, New York, NY (US)

(73) Assignee: SPOTIFY AB, Stockholm (SE)

( * ) Notice: Subject to any disclaimer, the term of this patent is extended or adjusted under 35 U.S.C. 154(b) by 1 day.

This patent is subject to a terminal disclaimer.

(21) Appl. No.: 15/954,056

(22) Filed: Apr. 16, 2018

(65) Prior Publication Data

US 2019/0089794 A1 Mar. 21, 2019

Related U.S. Application Data

(63) Continuation of application No. 15/645,800, filed on Jul. 10, 2017, now Pat. No. 9,948,736.

(51) Int. Cl.
G06F 15/16 (2006.01)
H04L 29/08 (2006.01)
H04L 29/06 (2006.01)
H04L 12/26 (2006.01)

(52) U.S. Cl.
CPC ............ H04L 67/22 (2013.01); H04L 43/028 (2013.01); H04L 43/062 (2013.01); H04L 43/0876 (2013.01); H04L 65/4069 (2013.01); H04L 65/4084 (2013.01); H04L 67/18 (2013.01)

(58) Field of Classification Search
CPC ........................... H04L 67/22; H04L 65/4069
See application file for complete search history.

(56) References Cited

U.S. PATENT DOCUMENTS 7,146,505 B1 * 12/2006 Harada ................ G06Q 20/206 713/185
9,727,644 B1 8/2017 Teng et al.
2004/0015541 A1 * 1/2004 Cotte ................ H04L 29/06027 709/203
2008/0040226 A1 * 2/2008 Roker .................... G06Q 30/02 705/14.56
2014/0297386 A1 * 10/2014 Allen ................. G06Q 10/0639 705/14.27
2016/0025859 A1 * 1/2016 Basnayake ............ G04R 20/06 342/357.62

(Continued)

Primary Examiner — Bryan Lee
(74) Attorney, Agent, or Firm — Tucker Ellis LLP

(57) ABSTRACT

In accordance with an embodiment, described herein is a system and method for use with a digital media content environment, such as a music streaming service, for providing real-time media consumption data. As users interact with the digital media content environment using media devices, usage data that describes the characteristics of media content being streamed for playing by the media devices, is collected by a counter processor, and associated with buckets indicative of periods of time within a plurality of time windows. The usage data associated with each time window can be processed, for example to generate real-time rankings, or other type of media consumption data, for use by a reporting server. The real-time media consumption data which is reported can be used, for example, by artists, managers, media content publishers, or other type of content providers, to evaluate fast-changing media consumption trends.

18 Claims, 9 Drawing Sheets

(56) References Cited

U.S. PATENT DOCUMENTS

2016/0148206 A1* 5/2016 Van ................. G06Q 30/06
                                                    705/44
2017/0004526 A1* 1/2017 Morovati ........... G06Q 30/0254
2017/0244773 A1   8/2017 Sheynman et al.

* cited by examiner

SYSTEM AND METHOD FOR PROVIDING REAL-TIME MEDIA CONSUMPTION DATA

CLAIM OF PRIORITY

This application is a continuation of and claims the benefit of priority to U.S. Patent Application titled "SYSTEM AND METHOD FOR PROVIDING REAL-TIME MEDIA CONSUMPTION DATA", application Ser. No. 15/645,800, filed Jul. 10, 2017, and subsequently issued as U.S. Pat. No. 9,948,736, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to digital media content environments, and are particularly related to a system and method for providing real-time media consumption data.

BACKGROUND

Today's consumers enjoy the ability to access a tremendous amount of media content, such as music and videos, using a wide variety of media devices. Digital media content environments, for example media streaming services such as Spotify, enable users to stream music content that complements their lifestyle, while commuting, exercising, relaxing at home, or engaging in other types of activities.

For artists, managers, media content publishers, or other type of content providers, a knowledge of how their media content is being enjoyed by users, can be extremely valuable. Although some media consumption metrics can be determined using a batch processing approach, which processes a large volume of data collected over a period of several days or weeks, consumption metrics determined in this manner may not be useful in evaluating fast-changing media consumption trends, for example to provide an indication of an artist's trending popularity.

SUMMARY

In accordance with an embodiment, described herein is a system and method for use with a digital media content environment, such as a music streaming service, for providing real-time media consumption data. As users interact with the digital media content environment using media devices, usage data that describes the characteristics of media content being streamed for playing by the media devices, is collected by a counter processor, and associated with buckets indicative of periods of time within a plurality of time windows. The usage data associated with each time window can be processed, for example to generate real-time rankings, or other type of media consumption data, for use by a reporting server. The real-time media consumption data which is reported can be used, for example, by artists, managers, media content publishers, or other type of content providers, to evaluate fast-changing media consumption trends.

DETAILED DESCRIPTION

As described above, for artists, managers, media content publishers, and other content providers, a knowledge of how their media content is being enjoyed by users, can be extremely valuable. Although some media consumption metrics can be determined using a batch processing approach, which processes a large volume of data collected over a period of several days or weeks, consumption metrics determined in this manner may not be useful in evaluating fast-changing media consumption trends, for example to provide an indication of an artist's trending popularity.

In accordance with an embodiment, described herein is a system and method for use with a digital media content environment, such as a music streaming service, for providing real-time media consumption data. As users interact with the digital media content environment using media devices, usage data that describes the characteristics of media content being streamed for playing by the media devices, is collected by a counter processor, and associated with buckets indicative of periods of time within a plurality of time windows. The usage data associated with each time window can be processed, for example to generate real-time rankings, or other type of media consumption data, for use by a reporting server. The real-time media consumption data which is reported can be used, for example, by artists, managers, media content publishers, or other type of content providers, to evaluate fast-changing media consumption trends.

In accordance with an embodiment, use cases can include, but are not limited to, for example, comparing several media artists based on the real-time media consumption data for each of those artists, to determine trending artists; evaluating potential concert locations for a particular artist based on the real-time media consumption data for that artist over various geographic locations; or ranking a plurality of media content items for one or more artists based on the real-time media consumption data for those media content items, for use in preparing advertising-related content.

Digital Media Content Environments

Figure 1:
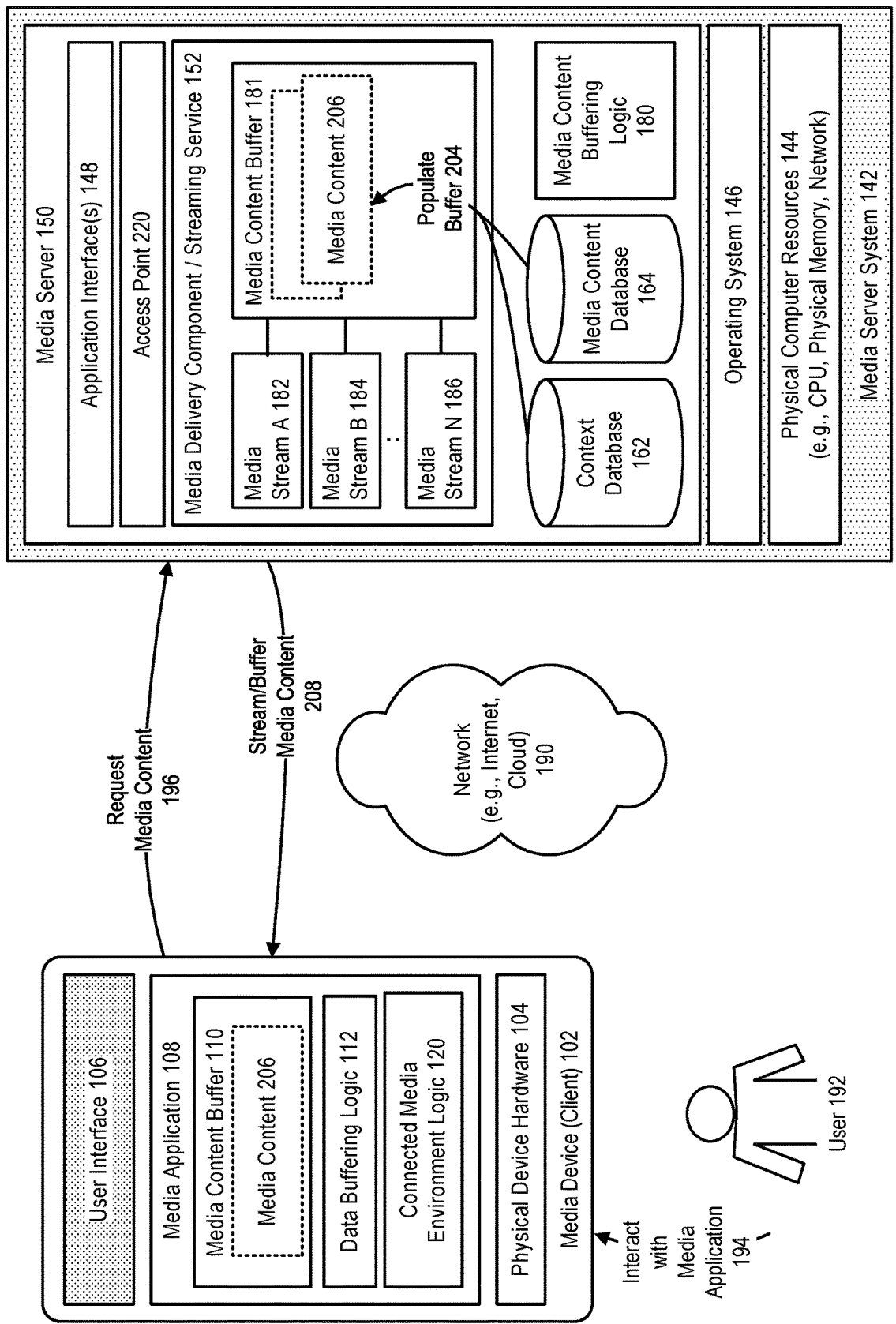
FIG. 1 illustrates an example digital media content environment, in accordance with an embodiment.

FIG. 1 illustrates an example digital media content environment, in accordance with an embodiment.

As illustrated in FIG. 1, in accordance with an embodiment, a media device 102, operating as a client device, can receive and play media content provided by a media server system 142 (media server), or by another system or peer device. In accordance with an embodiment, the media device can be, for example, a personal computer system, handheld entertainment device, tablet device, smartphone, television, audio speaker, in-car entertainment system, or other type of electronic or media device that is adapted or able to prepare a media content for presentation, control the presentation of media content, and/or play or otherwise present media content.

In accordance with an embodiment, each of the media device and the media server can include, respectively, one or more physical device or computer hardware resources 104, 144, such as one or more processors (CPU), physical memory, network components, or other types of hardware resources.

Although, for purposes of illustration, a single client media device and media server are shown, in accordance with an embodiment a media server can support the simultaneous use of a plurality of client media devices. Similarly, in accordance with an embodiment, a client media device can access media content provided by a plurality of media servers, or switch between different media streams produced by one or more media servers.

In accordance with an embodiment, the media device can optionally include a touch-enabled or other type of display screen having a user interface 106, which is adapted to display media options, for example as an array of media tiles, thumbnails, or other format, and to determine a user interaction or input. Selecting a particular media option, for example a particular media tile or thumbnail, can be used as a command by a user and/or the media device, to the media server, to download, stream or otherwise access a corresponding particular media content item or stream of media content.

In accordance with an embodiment, the media device can also include a software media application 108, together with an in-memory client-side media content buffer 110, and a client-side data buffering logic or software component 112, which can be provided as software or program code that is executable by a computer system or other processing device, and which can be used to control the playback of media content received from the media server, for playing either at a requesting media device (i.e., controlling device) or at a controlled media device (i.e., controlled device), in the manner of a remote control.

In accordance with an embodiment, a connected media environment logic or software component 120, which can be provided as software or program code that is executable by a computer system or other processing device, can be provided at the media device, either as part of the media application, or separately, for example as a firmware, to enable the media device to participate within a connected media environment (e.g., a Spotify Connect environment) that enables a user to control the playback of media content at such controlled devices.

In accordance with an embodiment, the client-side data buffering logic, together with the media content buffer, enables a portion of media content items, or samples thereof, to be pre-buffered at a client media device. For example, while media options are being prepared for display on a user interface, e.g., as media tiles or thumbnails, their related media content can be pre-buffered at the same time, and cached by one or more media devices in their media content buffers, for prompt and efficient playback when required.

In accordance with an embodiment, the media server can include an operating system 146 or other processing environment which supports execution of a media server 150 that can be used, for example, to stream music, video, or other forms of media content to a client media device, or to a controlled device.

In accordance with an embodiment, the media server can provide a subscription-based media streaming service, for which a client media device or user can have an associated account and credentials, and which enable the user's media device to communicate with and receive content from the media server. A received media-access request from a client media device can include information such as, for example, a network address, which identifies a destination media device to which the media server should stream or otherwise provide media content, in response to processing the media-access request.

For example, a user may own several media devices, such as a smartphone and an audio speaker, which can play media content received from a media server. In accordance with an embodiment, identifying information provided with a media-access request can include an identifier, such as an IP address, MAC address, or device name, which identifies that the media-access request is intended for use with a particular destination device. This allows a user, for example, to use their smartphone as a controlling device, and their audio speaker as a controlled device to which media content should be sent. The media server can then send the requested media and/or forward the media-access request to the audio speaker, even though the request originated at the user's smartphone.

In accordance with an embodiment, one or more application interface(s) 148 can receive requests from client media devices, or from other systems, to retrieve media content from the media server. A context database 162 can store data associated with the presentation of media content by a client media device, including, for example, a current position within a media stream that is being presented by the media device, or a playlist associated with the media stream, or one or more previously-indicated user playback preferences. The media server can transmit context information associated with a media stream to a media device that is presenting that stream, so that the context information can be used by the device, and/or displayed to the user. The context database can be used to store a media device's current media state at the media server, and synchronize that state between devices, in a cloud-like manner. Alternatively, media state can be shared in a peer-to-peer manner, wherein each device is aware of its own current media state which is then synchronized with other devices as needed.

For example, in accordance with an embodiment, when the destination media device to which the media content is being streamed changes, say from a controlling device to a controlled device, or from a first controlled device to a second controlled device, then the media server can transmit context information associated with an active media content to the newly-appointed destination device, for use by that device in playing the media content.

In accordance with an embodiment, a media content database 164 can include media content, for example music, songs, videos, movies, or other media content, together with metadata describing that media content. The metadata can be used to enable users and client media devices to search within repositories of media content, to locate particular media content items.

In accordance with an embodiment, a server-side media content buffering logic or software component 180, which can be provided as software or program code that is executable by a computer system or other processing device, can be used to retrieve or otherwise access media content items, in response to requests from client media devices or other systems, and to populate a server-side media content buffer 181, at a media delivery component or streaming service 152, which can be similarly provided as software or program code that is executable by a computer system or other processing device, with streams 182, 184, 186 of corresponding media content data, which can then be returned to the requesting device or to a controlled device.

In accordance with an embodiment, a plurality of client media devices, media server systems, and/or controlled devices, can communicate with one another using a network, for example the Internet 190, a local area network, peer-to-peer connection, wireless or cellular network, or other form of network. For example, a user 192 can interact 194 with the user interface at a client media device, and issue requests to access media content, for example the playing of a selected music or video item at their device, or at a controlled device, or the streaming of a media channel or video stream to their device, or to a controlled device.

In accordance with an embodiment, the user's selection of a particular media option can be communicated 196 to the media server, via the server's application interface. The media server can populate its server-side media content buffer at the server 204, with corresponding media content, 206 including one or more streams of media content data, and can then communicate 208 the selected media content to the user's media device, or to a controlled device as appropriate, where it can be buffered in a client-side media content buffer for playing at the device.

In accordance with an embodiment, and as further described below, the system can include a server-side media gateway or access point 220, provided as software or program code that is executable by a computer system or other processing device, or other process or component, which operates as a load balancer in providing access to one or more servers, for use in processing requests at those servers. The system can enable communication between a client media device and a server, via an access point at the server, and optionally the use of one or more routers, to allow requests from the client media device to be processed either at that server and/or at other servers.

For example, in a Spotify media content environment, Spotify clients operating on media devices can connect to various Spotify back-end processes via a Spotify "access-point", which forwards client requests to other servers, such as sending one or more metadataproxy requests to one of several metadataproxy machines, on behalf of the client or end user.

Real-Time Media Consumption Data

In accordance with an embodiment, described herein is a system and method for use with a digital media content environment, such as a music streaming service, for providing real-time media consumption data. As users interact with the digital media content environment using media devices, usage data that describes the characteristics of media content being streamed for playing by the media devices, is collected by a counter processor, and associated with buckets indicative of periods of time within a plurality of time windows. The usage data associated with each time window can be processed, for example to generate real-time rankings, or other type of media consumption data, for use by a reporting server. The real-time media consumption data which is reported can be used, for example, by artists, managers, media content publishers, or other type of content providers, to evaluate fast-changing media consumption trends.

In accordance with an embodiment, use cases can include, but are not limited to, for example, comparing several media artists based on the real-time media consumption data for each of those artists, to determine trending artists; evaluating potential concert locations for a particular artist based on the real-time media consumption data for that artist over various geographic locations; or ranking a plurality of media content items for one or more artists based on the real-time media consumption data for those media content items, for use in preparing advertising-related content.

Figure 2:
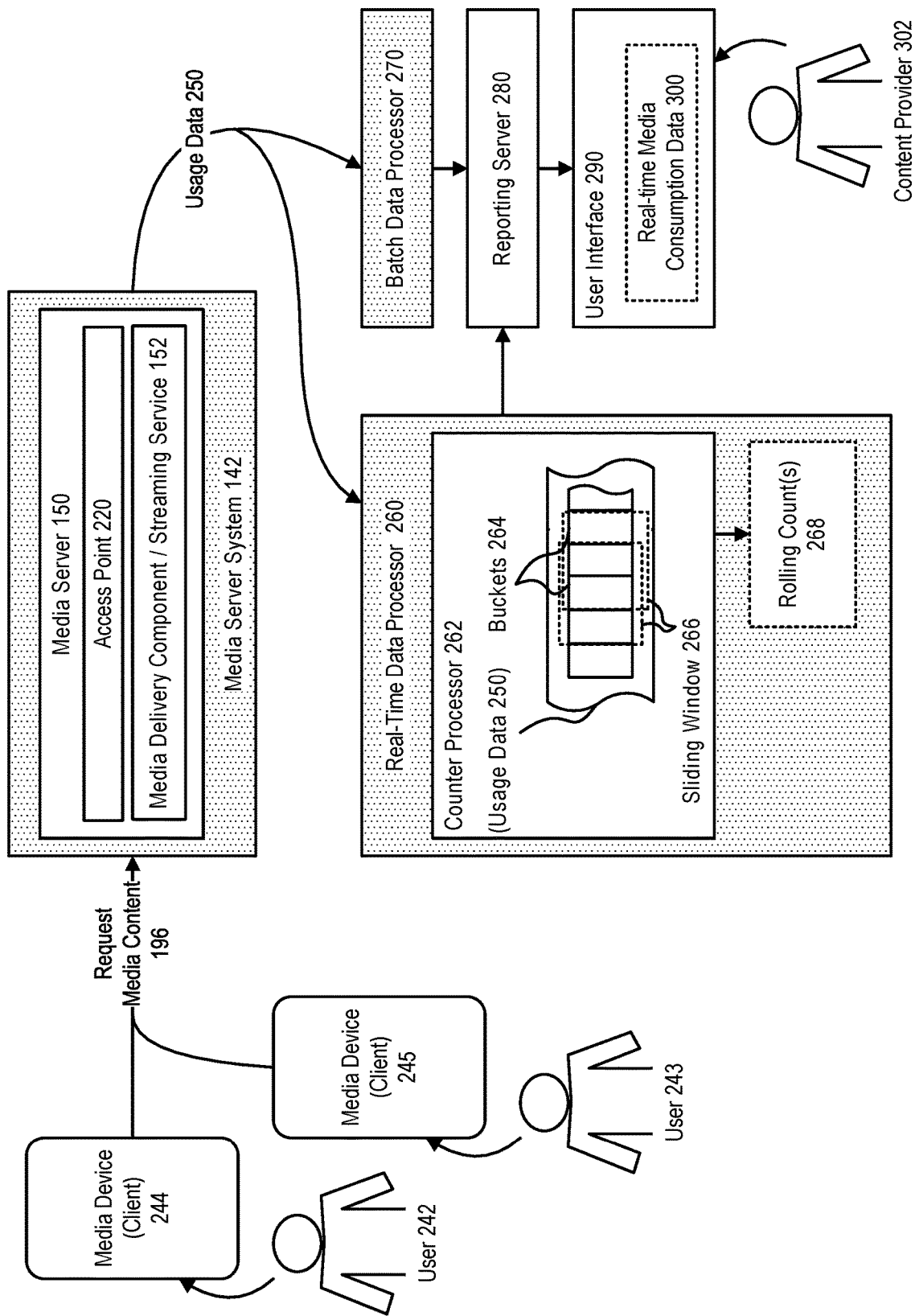
FIG. 2 illustrates a system for providing real-time media consumption data, in accordance with an embodiment.

FIG. 2 illustrates a system for providing real-time media consumption data, in accordance with an embodiment.

As illustrated in FIG. 2, in accordance with an embodiment, a media server can be configured to receive requests from client media devices 244, 245, to access media content, and to stream a plurality of media streams to the media devices in response to the requests.

For example, as described above, a media device can be configured to request media content from the media server via an access point, in response to interaction by a user.

In accordance with an embodiment, the media server can be configured so that, as a plurality of users 242, 243 play their requested media content, at their respective media devices, a usage data 250 that describes the characteristics of the media content being streamed for playing by the media devices, can be collected by the media server.

Examples of such usage data can include, but are not limited to, the number of users currently playing a particular media content item. Additional types of usage data provided by the media server can include, for example, user attribute data such as current location, current playing position, or user profile information; or metadata attribute data associated with one or more media content items being played, for example metadata attributes such as title, artist, or genre.

In accordance with an embodiment, the usage data provided by the media server can be received at a real-time data processor 260 capable of processing streams of data in real-time, such as, for example, an Apache Storm environment, or other type of real-time data processing environment, that can be configured with a counter processor 262 to receive and process a stream of usage data provided by the media server.

In accordance with an embodiment, the usage data can be associated with a plurality of buckets 264 according to a sliding window 266. For each bucket within the sliding window, the usage data associated therewith can be filtered according to at least one of a user attribute or other type of metadata attribute that is associated with the media content being consumed, to determine one or more user counts for that bucket.

In accordance with an embodiment, one or more rolling count(s) 268 are then determined, by summing a plurality of user counts that are associated with the plurality of buckets within the sliding window.

In accordance with an embodiment, the one or more rolling count(s) provided by the real-time data processor, which are indicative of the usage data provided by the media server, can be provided to a reporting server 280.

In accordance with an embodiment, the data provided by the real-time data processor, to the reporting server, can serve as ranking data by, for example, artists, managers, or media content publishers.

In accordance with an embodiment, the rolling count(s) can then be provided as a real-time media consumption data 300.

In accordance with an embodiment, the usage data collected by the media server can also be provided to a batch data processor 270 such as, for example, an Apache Hadoop environment, or other type of distributed data storage and processing environment, that is capable of receiving and processing large amounts of usage data.

In accordance with an embodiment, depending on the particular use case, the reporting server can receive data from both the real-time data processor, and batch data processor, for use in providing consumption information.

In accordance with an embodiment, a user interface 290 can be provided to enable a content provider 302 to access the real-time media consumption data, examples of which are further described below.

Figure 3:
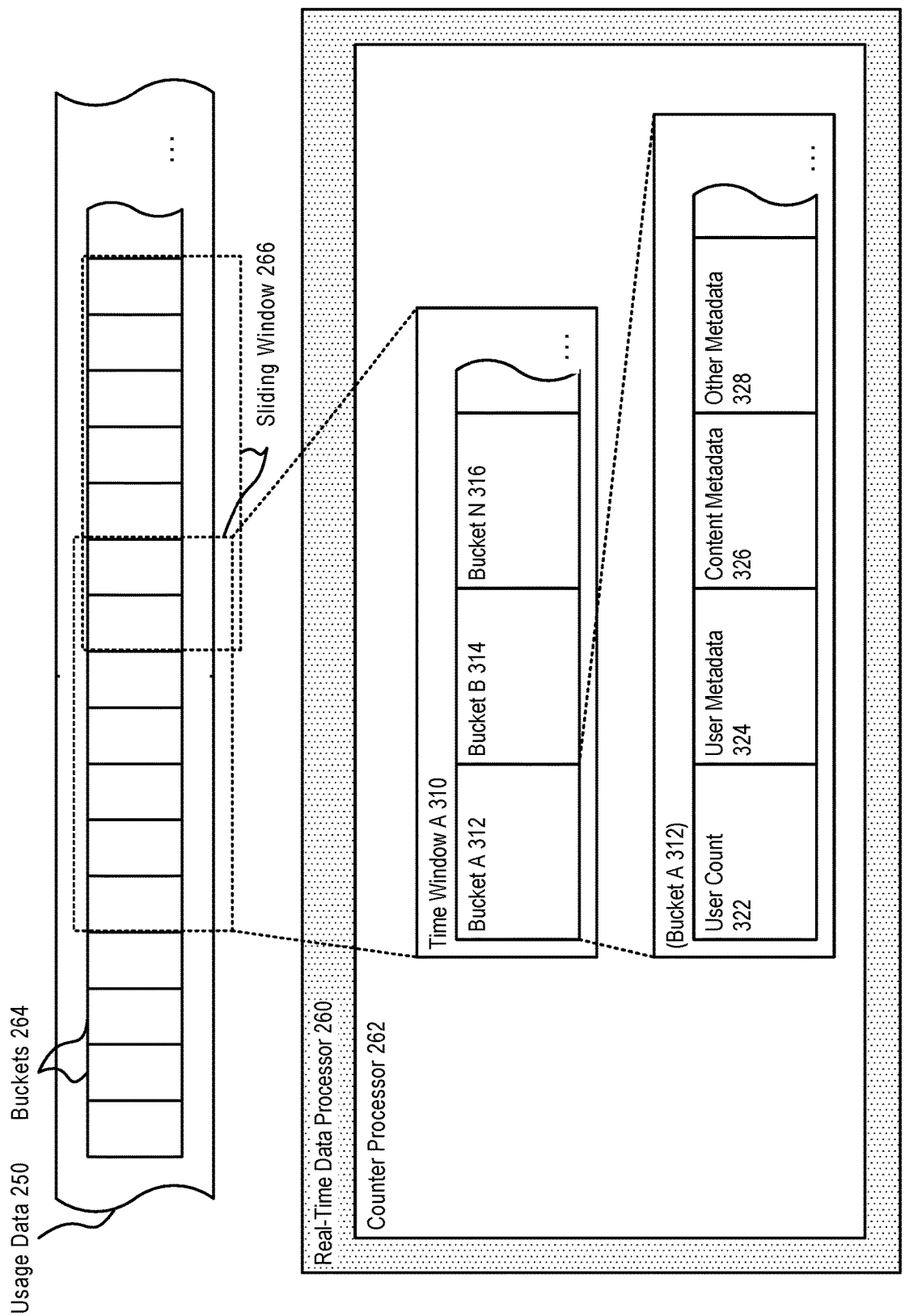
FIG. 3 illustrates a processing of usage data and association with buckets indicative of periods of time, in accordance with an embodiment.

FIG. 3 illustrates a processing of usage data and association with buckets indicative of periods of time, in accordance with an embodiment.

As illustrated in FIG. 3, in accordance with an embodiment, a continuous stream of usage data can be collected by the media server, and provided to the real-time data processor.

In accordance with an embodiment, a portion of the usage data can be associated with a particular media stream of the plurality of media streams being provided by the media server environment for streaming to one or more media devices. For example, a portion of the usage data illustrated in FIG. 3, can correspond to one or more media streams, such as one of the media streams A, B, or C illustrated in FIG. 1.

In accordance with an embodiment, the usage data can be associated with or allocated among a plurality of buckets, represented in this instances by buckets A 312, B 314, and N 316. Each bucket can correspond to usage data for a portion of one or more associated media streams.

For example, in accordance with an embodiment, each bucket can correspond to a 1-second portion of an associated media stream. During a particular 1-second time period, the real-time data processor collects a count of users (i.e., a user count) who are playing the associated media stream during that time period or bucket.

In accordance with an embodiment, the real-time data processor can be configured to associate the usage data with the plurality of buckets according to a sliding window that determines a plurality of discrete time windows such that, for example, a particular time window A 310 is associated with the plurality of buckets A, B, and N, and potentially other buckets within that time window.

For example, in accordance with an embodiment, the sliding window can be associated with a time period of 4-minutes (i.e., 240 seconds, which is a length comparable to many music tracks), which means that in the above example that employs a plurality of 1-second buckets, each discrete time window would comprise 240 of the 1-second buckets.

Although the above examples illustrate the use of 1-second buckets and 4-minute long time windows, in accordance with other embodiments other durations can be used.

As further illustrated in FIG. 3, each bucket (including in this particular example, bucket A) can include different components of usage data, such as, for example, a user count 322, user metadata 324, media content metadata 326, or other metadata 328.

In accordance with an embodiment, the user count represents a count of users who are playing the associated media stream during the time period represented by a particular bucket (in this example, bucket A), according to certain criteria. The user data can include data describing user attributes such as, for example, gender, age, or current location. The media content metadata can include data describing media content attributes such as, for example, title, artist, or genre. Other metadata can also be included in the usage data as appropriate.

The above examples of which types of data and metadata are counted are provided by way of example. In accordance with other embodiments, other types of data and metadata, and manner of counting, can be used.

Figure 4:
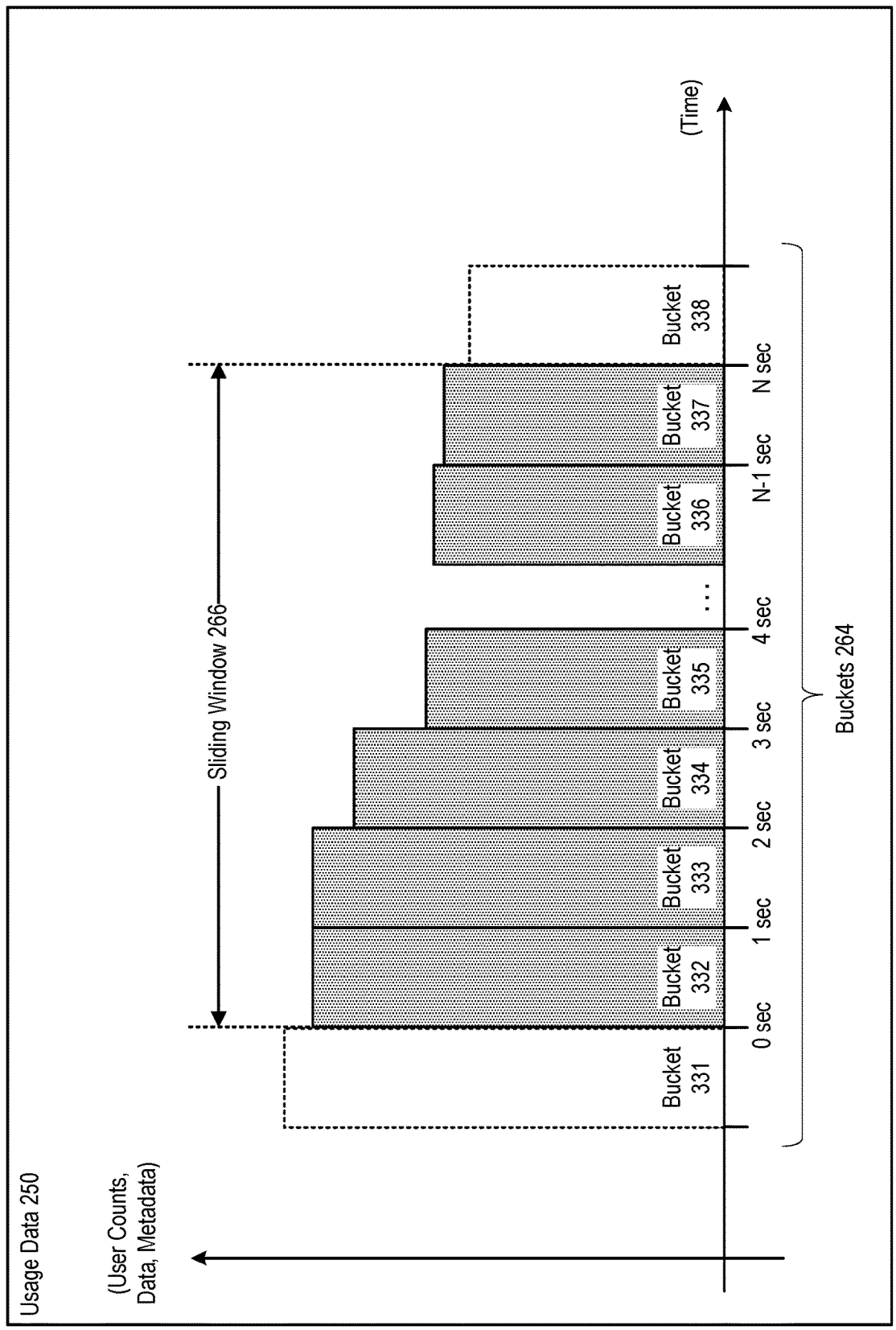
FIG. 4 illustrates the accumulation of counts for sets of buckets within each of a plurality of time windows, for an example set of data, in accordance with an embodiment.

FIG. 4 illustrates the accumulation of user counts for sets of buckets within each of a plurality of time windows, for an example set of data, in accordance with an embodiment.

As illustrated in the example shown in FIG. 4, the user counts for each bucket can vary depending on the particular time period represented by each bucket (in this example buckets 331, 332, 333, 334, 335, 336, 337, 338). In this example, each bucket represents a 1-second time period of the associated media stream. In the illustrated example, the associated media stream appears to exhibit a downward trend in popularity during the time period represented by the sliding window, in that as time proceeds, fewer users are determined to be playing the associated media stream.

Figure 5A:
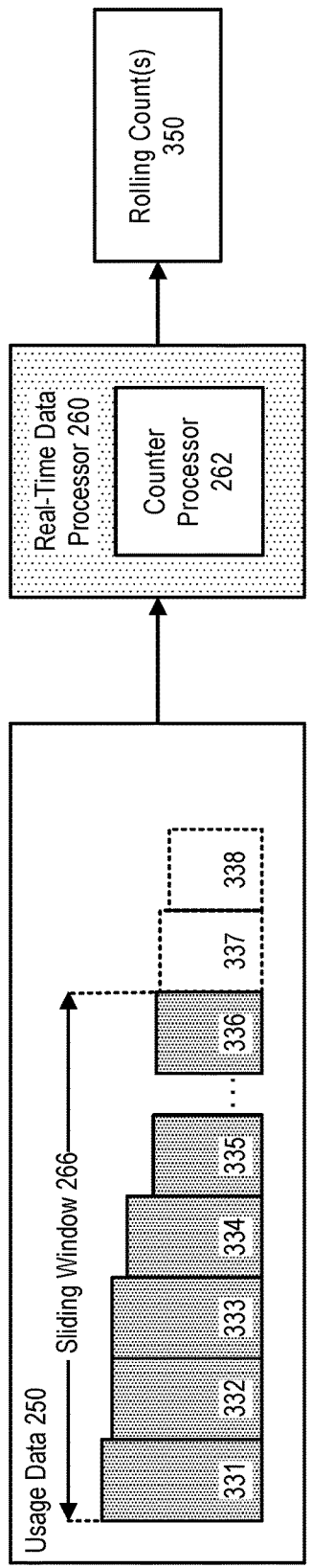
FIGS. 5A, 5B, and 5C illustrate an example use of a sliding window with sets of buckets within each of a plurality of time windows, for an example set of data, in accordance with an embodiment.
Figure 5B:
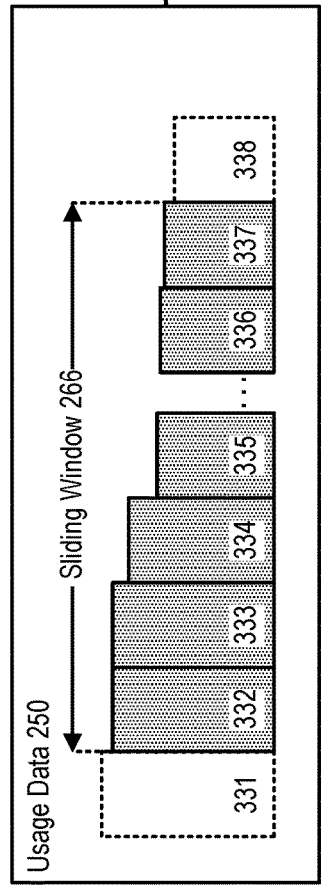
Figure 5C:
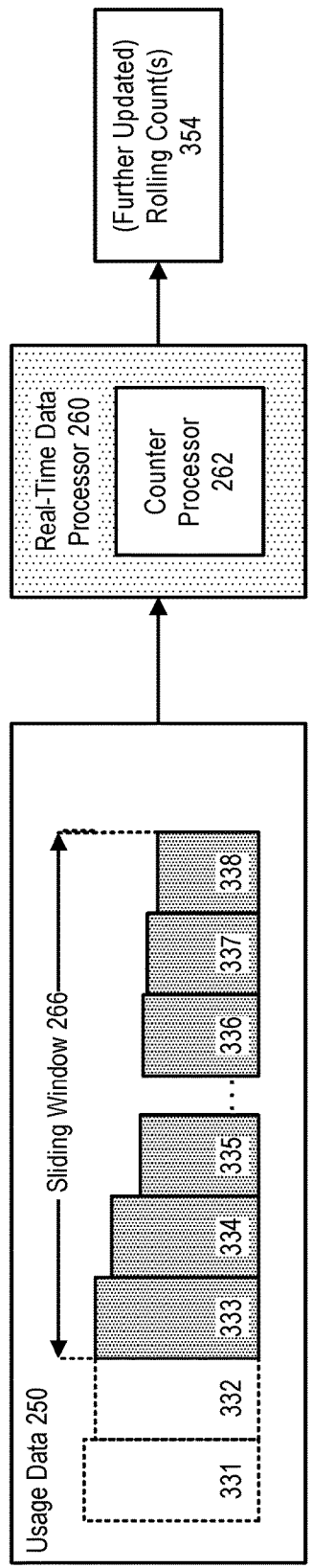

FIGS. 5A, 5B, and 5C illustrate an example use of a sliding window with sets of buckets within each of a plurality of time windows, for an example set of data, in accordance with an embodiment.

In accordance with an embodiment, the sliding window can be periodically updated to remove one or more older buckets of usage data, and add one or more new buckets of usage data. For example, as illustrated in FIG. 5A, the sliding window at a first point in time (during a first time period) includes buckets 331 through 336.

As illustrated in FIG. 5B, at a subsequent point in time (during a second time period), the first bucket from the first time window (331) has been removed from the plurality of buckets associated with the sliding window, and a new bucket 337 has been added to the end of the time window.

As illustrated in FIG. 5C, at a next subsequent point in time (during a third time period), the first bucket from the second time window (332), has been removed from the plurality of buckets associated with the sliding window, and a new bucket 338, has been added to the end of the time window.

In accordance with an embodiment, older buckets that are outside of the sliding window can be dropped, and new buckets can be added periodically (such as, using the above example, every 1-second). The number of buckets within the sliding window can be maintained at a certain amount, (such as, using the above example, 240 buckets), as additional usage data is continuously received and processed by the real-time data processor.

In accordance with an embodiment, the real-time data processor can be configured to update one or more rolling count(s) of users consuming particular media content items having associated metadata, during a particular time window. The rolling count can be determined by summing the user counts corresponding to each bucket, of the plurality of buckets, within the sliding window.

For example, as illustrated in FIG. 5A, in the example therein the rolling count 350 can be determined by summing the individual user counts associated with the various buckets (for example buckets 331 through 336). Using the example of 240 buckets, each corresponding to a 1-second time period, the sliding window therefore provides a rolling count corresponds to a 4-minute snapshot of users playing the associated media stream during the represented time period. Such a 4-minute snapshot mirrors a common length for many music tracks, although in other embodiments other durations can be used to provide similarly-useful snapshots.

As time progresses, as illustrated in FIG. 5B, an updated rolling counts 352 value can be determined. Similarly, as time progresses yet further, as illustrated in FIG. 5C, a further updated rolling counts 354 value can be determined.

In accordance with an embodiment, the user counts associated with each bucket can be determined by the real-time data processor. For example, as described in further detail below, a real-time data processor such as, for example an Apache Storm environment, or other type of real-time data processing environment, can be configured to use a combination of spouts and bolts to define information sources and manipulations for processing the usage data associated with each bucket, and the rolling count(s).

Data Processing Topology

Figure 6:
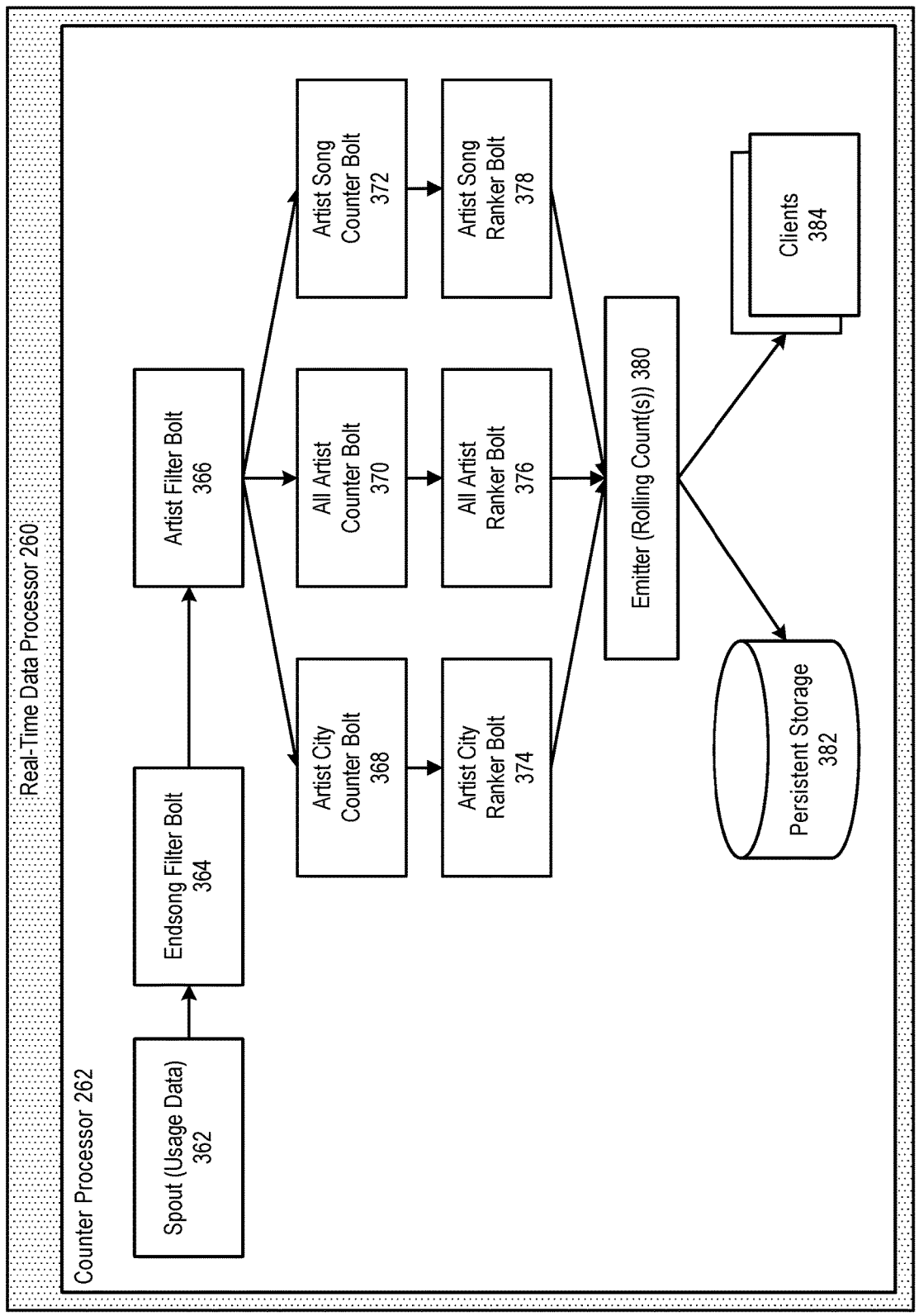
FIG. 6 illustrates a data processing topology for determination of real-time media consumption data, in accordance with an embodiment.

FIG. 6 illustrates a data processing topology for determination of real-time media consumption data, in accordance with an embodiment.

As described above, in accordance with an embodiment, as users interact with the digital media content environment using media devices, usage data that describes the characteristics of media content being streamed for playing by the media devices, can be collected by a counter processor, and associated with buckets indicative of periods of time within a plurality of time windows.

In accordance with an embodiment, a real-time data processor such as, for example an Apache Storm environment, or other type of real-time data processing environment, can be configured according to a data processing topology to operate as the counter processor, to process usage data, for example through the use of spouts and bolts that define information sources and manipulations that enable processing of streaming data.

In accordance with an embodiment, in such a data processing topology, each spout can read from a queue of data, (such as, for example, an Apache Kafka instance, or other type of data stream processing environment); while each bolt can process a number of input streams and produce a number of new output streams, incorporating functions such as filters, streaming joins, streaming aggregations, and communication with databases.

As illustrated in FIG. 6, in accordance with an embodiment, a spout 362 can be configured to stream usage data to an endsong filter bolt 364, which can be configured to discard certain data tuples within the usage data.

For example, in accordance with an embodiment, the endsong filter bolt can be used to disregard (or exempt from the count) those users that have played the associated media stream for less than a threshold amount of time (e.g., less than 30 seconds). The remaining users can be considered proper "listeners" (or "viewers") of the media stream, since they have played the media stream for longer than the threshold amount of time.

In accordance with an embodiment, an artist filter bolt 366 can be configured to filter the usage data according to a metadata attribute (or criterion) indicative of a particular artist.

For example, the usage data associated with the particular bucket being processed can be filtered to include only those users who are playing media content by a particular artist during the represented time period.

In accordance with an embodiment, the artist filter bolt can be configured to output the filtered data to an artist city counter bolt 368, an all artist counter bolt 370, and an artist song counter bolt 372.

For example, in accordance with an embodiment, the artist city counter bolt can be configured to process the filtered data output by the artist filter bolt, according to particular cities where users are currently listening to that artist's content (i.e., listening within the time period represented by the bucket).

In accordance with an embodiment, the artist city counter bolt can produce one or more user counts associated with one or more cities, and output the user counts to an artist city ranker bolt 374.

In accordance with an embodiment, the artist city ranker bolt can be configured to generate rankings data based on the user counts received from the artist city counter bolt. For example, the artist city ranker bolt can rank the one or more cities according to the user count corresponding to each city.

In accordance with an embodiment, the artist city ranker bolt can be configured to provide the rankings data to an emitter 380, for use in calculating one or more rolling count(s).

Similarly, in accordance with an embodiment, the all artist counter bolt can be configured to process the filtered data output by the artist filter bolt, by counting a number of users listening to a plurality of artists. The all artist counter bolt can produce one or more user counts associated with the plurality of artists, and output the user counts to an all artist ranker bolt 376.

In accordance with an embodiment, the all artist ranker bolt can be configured to generate rankings data based on the user counts received from the all artist counter bolt. For example, the all artist ranker bolt can rank the plurality of artists according to the user count corresponding to each artist. The all artist ranker bolt can be configured to provide the rankings data to the emitter bolt.

Similarly, in accordance with an embodiment, the artist song counter bolt can be configured to process the filtered data output by the artist filter bolt, according to particular songs that users are currently playing (playing within the time period represented by the bucket) by the artist. The artist song counter bolt can produce one or more user counts associated with one or more songs by the artist, and output the user counts to the artist song ranker bolt 378.

In accordance with an embodiment, the artist song ranker bolt can be configured to generate rankings data based on the user counts received from the artist song counter bolt. For example, the artist song ranker bolt can rank the one or more songs according to the user count corresponding to each song. The artist song ranker bolt can be configured to provide the rankings data to the emitter bolt.

In accordance with an embodiment, the emitter can be configured to emit the rolling counts and/or ranking data to, for example, one or both of a persistent storage 382 or one or more clients 384, including, for example, a reporting server and/or user interface as described herein.

The above-described data processing topology, including the use of particular counters and rankers implemented as Apache Storm bolts, is provided by way of example, to illustrate various use cases. In accordance with other embodiments, other types of counters and rankers can be used, to provide other types of usage and/or ranking information, and to support other use cases.

User Interface for Real-Time Media Consumption Data

Figure 7:
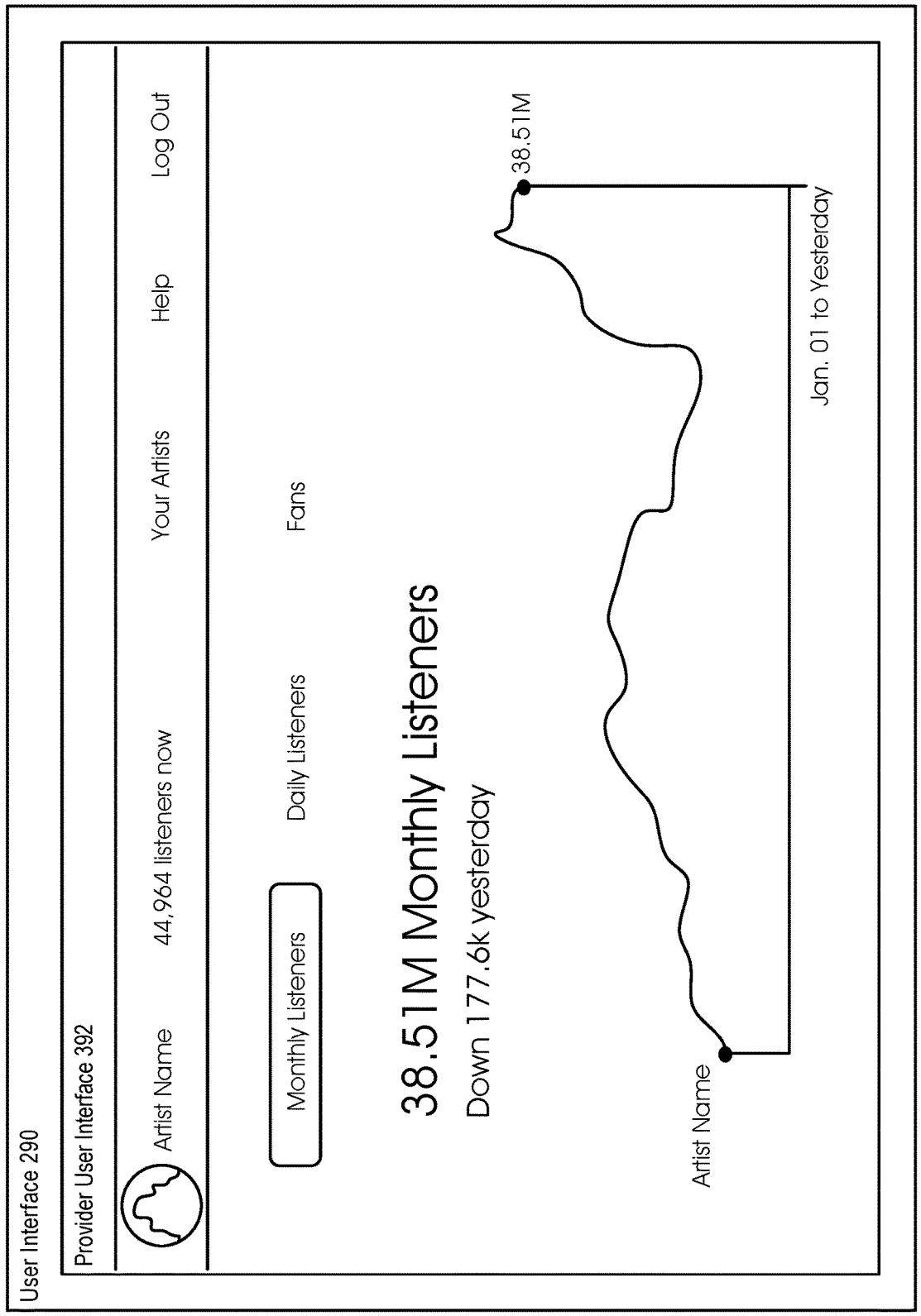
FIG. 7 illustrates an example user interface, including providing real-time media consumption data for a particular artist, at a provider user interface, in accordance with an embodiment.

FIG. 7 illustrates an example user interface, including providing real-time media consumption data for a particular artist, at a provider user interface, in accordance with an embodiment.

As illustrated in FIG. 7, in accordance with an embodiment, a provider of media content, for example an artist, manager, media content publisher, or other type of content provider, can use the provider user interface 392 to evaluate fast-changing media consumption trends, as indicated by the real-time media consumption data.

For example, in accordance with an embodiment, the real-time media consumption data can provide an indication such as current listeners for a particular artist (e.g., "44,964 listeners now"), together with trends in listenership over a period of time (e.g., "38.51 M Monthly Listeners", or "Down 177.6 k yesterday"). The real-time media consumption data can be presented in a particular display format, for example as a, histogram, line chart, or other type of infographic.

Figure 8:
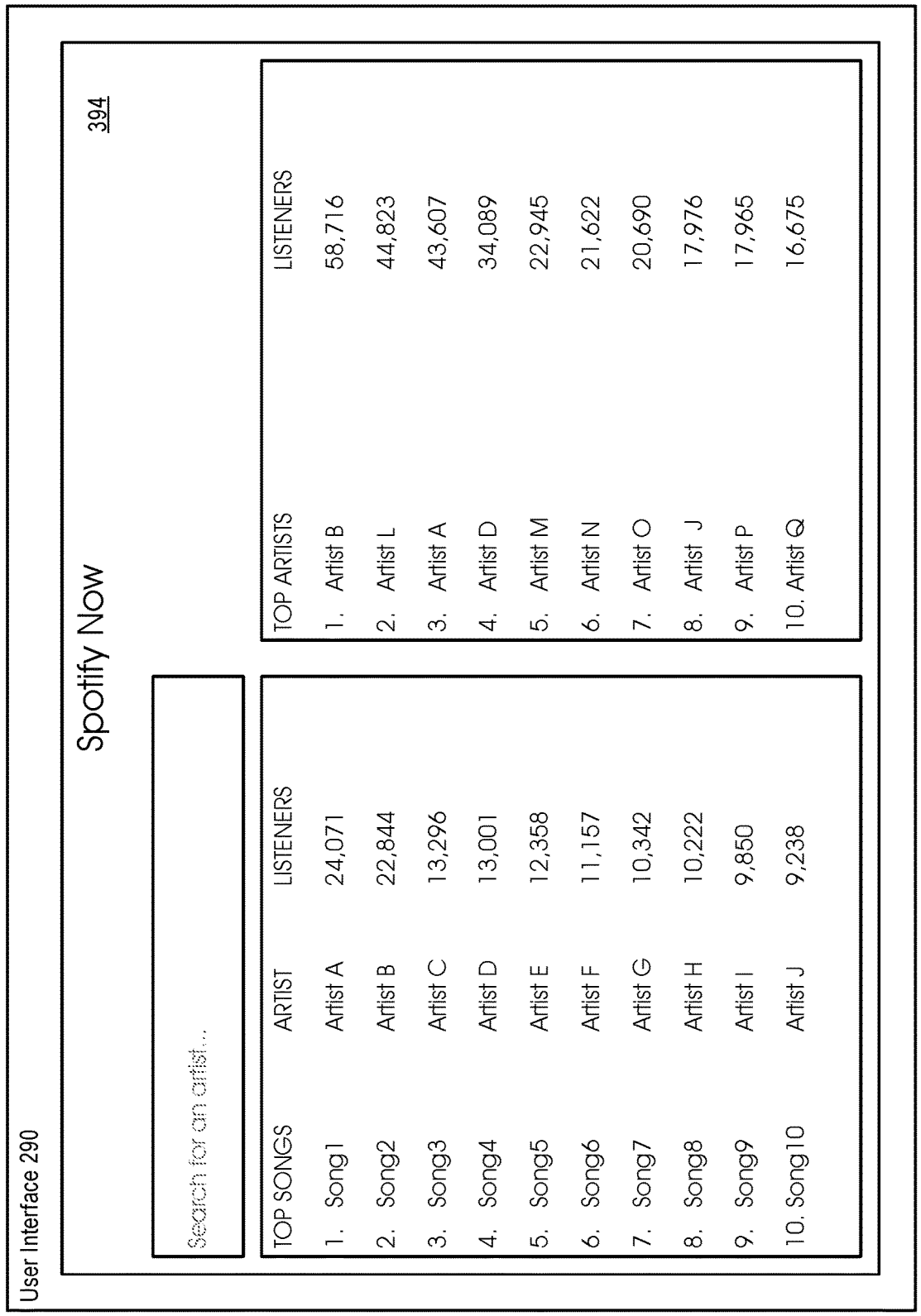
FIG. 8 illustrates an example user interface, including providing a comparison of several artists, and ranking a plurality of media content items, based on the real-time media consumption data for those artists and media content items, in accordance with an embodiment.

FIG. 8 illustrates an example user interface, including providing a comparison of several artists, and ranking a plurality of media content items, based on the real-time media consumption data for those artists and media content items, in accordance with an embodiment.

As illustrated in FIG. 8, in accordance with an embodiment, the user interface can display rankings data 394, which can be provided in the form of lists.

For example, in accordance with an embodiment, the user interface can display ranked lists based on real-time media consumption data, including, e.g., top songs and/or top artists.

The above examples of user interfaces, including provider user interfaces and displays of rankings data are provided by way of example, to illustrate various potential uses of real-time media consumption data. In accordance with other embodiments, other use cases and uses can be provided.

Example Method of Providing Real-Time Media Consumption Data

Figure 9:
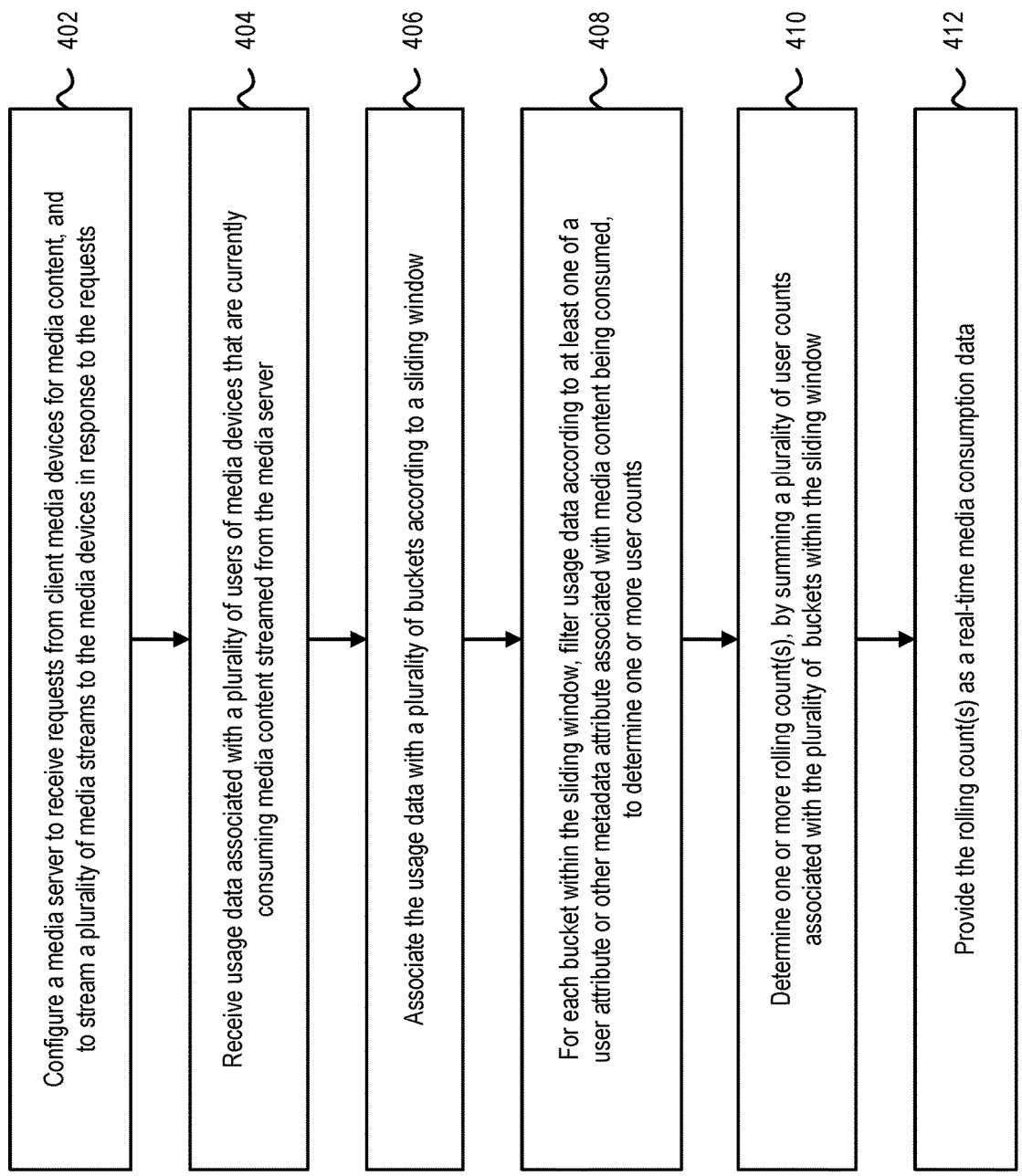
FIG. 9 illustrates a method of providing real-time media consumption data, in accordance with an embodiment.

FIG. 9 illustrates a method of providing real-time media consumption data, in accordance with an embodiment.

In accordance with an embodiment, at operation 402, a media server is configured to receive requests from client media devices for media content, and to stream a plurality of media streams to the media devices in response to the requests.

In accordance with an embodiment, at operation 404, usage data associated with a plurality of users of media devices that are currently consuming media content streamed from the media server, is received.

In accordance with an embodiment, at operation 406, the usage data is associated with a plurality of buckets according to a sliding window.

In accordance with an embodiment, at operation 408, for each bucket within the sliding window, the usage data is filtered according to at least one of a user attribute or other type of metadata attribute associated with the media content being consumed, to determine one or more user counts.

In accordance with an embodiment, at operation 410, one or more rolling count(s) are determined, by summing a plurality of user counts associated with the plurality of buckets within the sliding window.

In accordance with an embodiment, at operation 412, the rolling count(s) are provided as a real-time media consumption data.

Embodiments can be conveniently implemented using one or more conventional general purpose or specialized digital computers, computing devices, machines, or microprocessors, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory computer readable storage medium (media) having instructions stored thereon/in which can be used to program a computer to perform any of the processes of the present invention. Examples of storage mediums can include, but are not limited to, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or other types of storage media or devices suitable for non-transitory storage of instructions and/or data.

The foregoing description of embodiments has been provided for the purposes of illustration and description. It is not intended to be exhaustive or to limit the invention to the precise forms disclosed. Many modifications and variations will be apparent to the practitioner skilled in the art.

For example, while the techniques described above generally illustrate examples of digital media content environments that include a music streaming service such as Spotify, and streamed music or song content, the systems and techniques described herein can be similarly used with other types of media content environments, and other types of streamed data or media content.

Additionally, while several of the above examples generally illustrate filtering of user counts and ranking of particular attributes such as artist, city, and song, in accordance with various embodiments, other types of user and metadata attributes can be used.

In addition, while the above examples illustrate the use of technologies such as Apache Storm, Apache Hadoop, and Apache Kafka, to process large amounts of usage data, in accordance with various embodiments, other forms of data processors or processing environments can be used.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for providing real-time media consumption data, comprising:
   one or more computers providing access to a digital media content environment, including a media server that receives requests from client media devices for media content, and provides media content items to the media devices in response to the requests;
   wherein the system operates to:
   receive, as users of the media devices interact with the digital media content environment, a usage data describing the characteristics of the media content items being streamed by the media server for playing by the media devices;

associate the usage data with periods of time, including accumulating user counts for each of a plurality of time windows;

for each particular time window, process the usage data by one or more real-time data processors to determine metadata attributes associated with the user counts; and determine one or more rolling counts of the metadata attributes to be provided as real-time media consumption data.

2. The system of claim 1, further comprising filtering the usage data according to endsong events indicative that one or more users have played a particular media content item.

3. The system of claim 1, wherein the user counts are determined according to a user attribute indicative of geographic locations of users currently consuming particular media content items.

4. The system of claim 1, wherein the user counts are determined according to a metadata attribute indicative of a plurality of artists or plurality of media content items currently being played.

5. The system of claim 3, wherein a rankings data includes a ranking of the geographic locations of users currently consuming particular media content items.

6. The system of claim 4, wherein a rankings data includes a ranking of the plurality of artists or plurality of media content items currently being played.

7. A method of providing real-time media consumption data, the method comprising:

providing, at one or more computers, a digital media content environment, including a media server that receives requests from client media devices for media content, and provides media content items to the media devices in response to the requests;

receiving, as users of the media devices interact with the digital media content environment, a usage data describing the characteristics of the media content items being streamed by the media server for playing by the media devices;

associating the usage data with periods of time, including accumulating user counts for each of a plurality of time windows;

for each particular time window, processing the usage data by one or more real-time data processors to determine metadata attributes associated with the user counts; and determining one or more rolling counts of the metadata attributes to be provided as real-time media consumption data.

8. The method of claim 7, further comprising filtering the usage data according to endsong events indicative that one or more users have played a particular media content item.

9. The method of claim 7, wherein the user counts are determined according to a user attribute indicative of geographic locations of users currently consuming particular media content items.

10. The method of claim 7, wherein the user counts are determined according to a metadata attribute indicative of a plurality of artists or plurality of media content items currently being played.

11. The method of claim 9, wherein a rankings data includes a ranking of the geographic locations of users currently consuming particular media content items.

12. The method of claim 10, wherein a rankings data includes a ranking of the plurality of artists or plurality of media content items currently being played.

13. A method of receiving and displaying real-time media consumption data, comprising:

determining, as users of client media devices interact with a digital media content environment, a usage data describing the characteristics of media content items being streamed by a media server for playing by the media devices;

associating the usage data with periods of time, including accumulating user counts for each of a plurality of time windows;

for each particular time window, processing the usage data by one or more real-time data processors to determine metadata attributes associated with the user counts; and receiving and displaying one or more rolling counts of the metadata attributes as real-time media consumption data.

14. The method of claim 13, further comprising filtering the usage data according to endsong events indicative that one or more users have played a particular media content item.

15. The method of claim 13, wherein the user counts are determined according to a user attribute indicative of geographic locations of users currently consuming particular media content items.

16. The method of claim 13, wherein the user counts are determined according to a metadata attribute indicative of a plurality of artists or plurality of media content items currently being played.

17. The method of claim 15, wherein a rankings data includes a ranking of the geographic locations of users currently consuming particular media content items.

18. The method of claim 16, wherein a rankings data includes a ranking of the plurality of artists or plurality of media content items currently being played.

* * * * *